United States Patent
Delrosario et al.

(10) Patent No.: US 6,481,995 B2
(45) Date of Patent: Nov. 19, 2002

(54) APPARATUS FOR MAKING MULTILAYER ROLLS HAVING A THIN FLUOROPOLYMER TOP COAT

(75) Inventors: Chris F. Delrosario, Demarest; Melvin F. Luke, Butler; Timothy D. Marvil, Sussex, all of NJ (US)

(73) Assignee: Ames Rubber Corporation, Hamburg, NJ (US)

( * ) Notice: Subject to any disclaimer, the term of this patent is extended or adjusted under 35 U.S.C. 154(b) by 0 days.

(21) Appl. No.: 09/753,204

(22) Filed: Jan. 2, 2001

(65) Prior Publication Data

US 2001/0006268 A1 Jul. 5, 2001

Related U.S. Application Data

(62) Division of application No. 08/959,397, filed on Oct. 28, 1997, now Pat. No. 6,168,751.

(51) Int. Cl.[7] .............................................. B29C 45/14
(52) U.S. Cl. ..................... 425/123; 425/127; 425/129.1; 264/262
(58) Field of Search ............................... 425/547, 127, 425/129.1, 123, 112, 115, 190, 192 R; 264/261, 262

(56) References Cited

U.S. PATENT DOCUMENTS

| | | | |
|---|---|---|---|
| 419,913 A | * | 1/1890 | Bingham .................. 425/129.1 |
| 419,914 A | * | 1/1890 | Bingham .................. 425/129.1 |
| 2,686,936 A | | 8/1954 | Tuckerman et al. |
| 3,613,168 A | | 10/1971 | Rowland et al. |
| 3,724,983 A | * | 4/1973 | Nelson ........................ 425/129 |
| 4,258,089 A | | 3/1981 | Anderson |
| 4,462,782 A | * | 7/1984 | Koser .......................... 425/183 |
| 4,643,660 A | * | 2/1987 | Capelle ....................... 425/190 |
| 4,892,696 A | * | 1/1990 | Murakami et al. .......... 264/219 |
| 4,997,613 A | | 3/1991 | McMillan |
| 5,798,181 A | | 8/1998 | Hobson et al. |

* cited by examiner

Primary Examiner—Nam Nguyen
Assistant Examiner—Brian L. Mutschler
(74) Attorney, Agent, or Firm—Reed Smith LLP; Michael I. Wolfson

(57) ABSTRACT

A multi-layer roll having a thin fluoropolymer top coat on an elastomeric base layer bonded to a substantially rigid insert is provided. The top coat is formed by placing a thin non-self supporting fluoropolymer sleeve about the insert, or wrapping extruded fluoropolymer film about the insert which is placed in a mold sleeve and positioned in a book mold to hold the membrane in place. Liquid or flowable elastomer is injected into the space between the insert and flexible top coat at a point downstream of where the top layer is held in position between mold elements to prevent wrinkling. The mold is then heated to cure the elastomer.

10 Claims, 6 Drawing Sheets

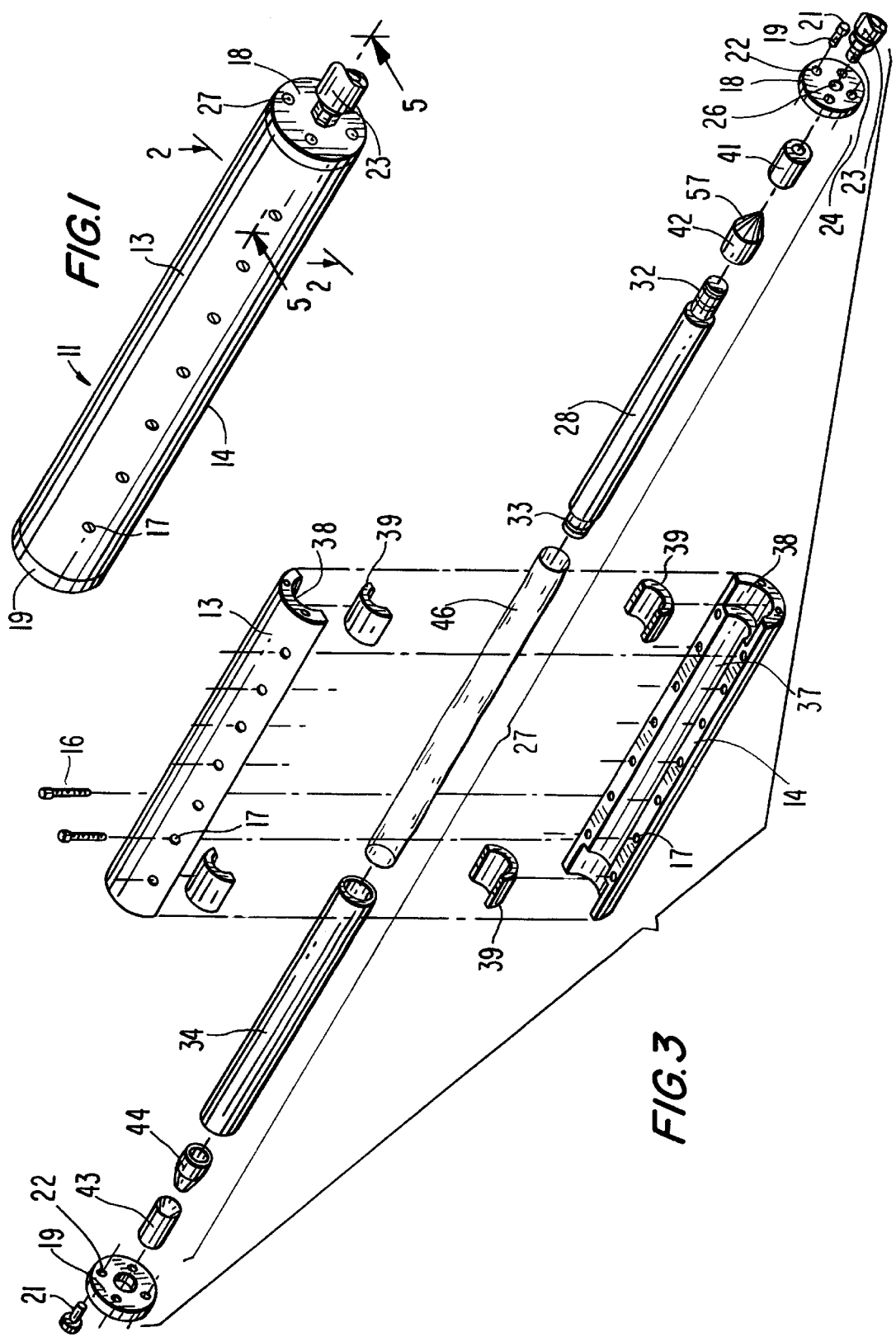

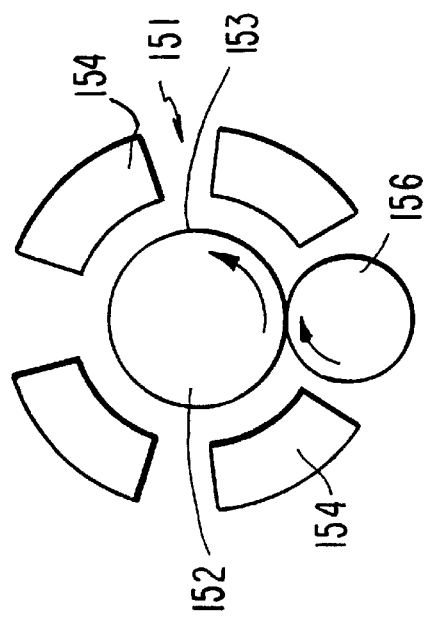
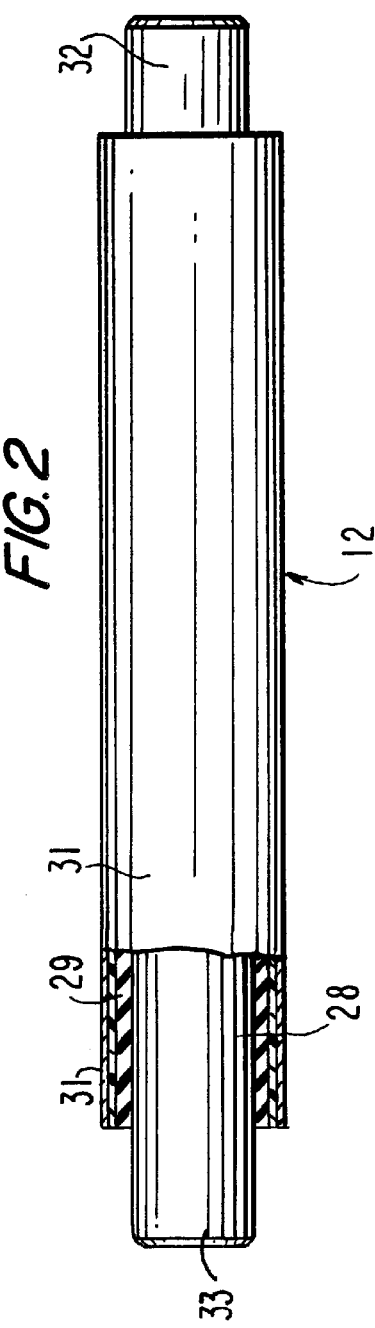
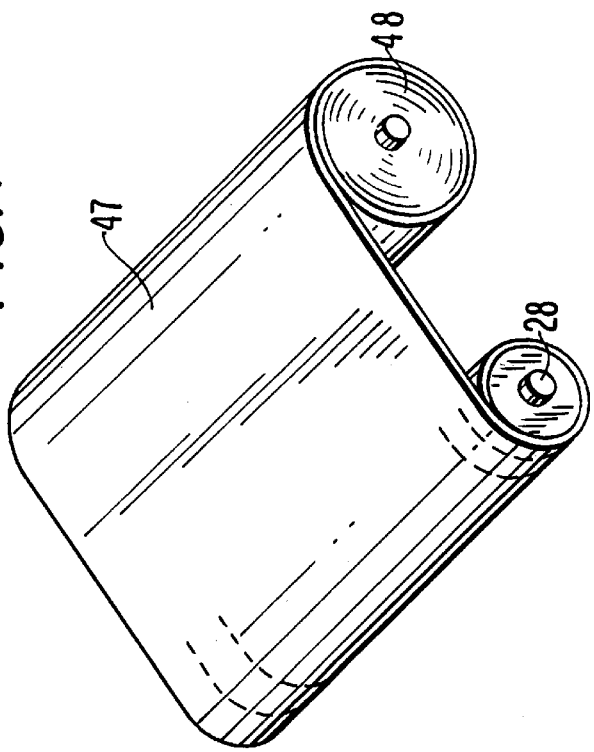

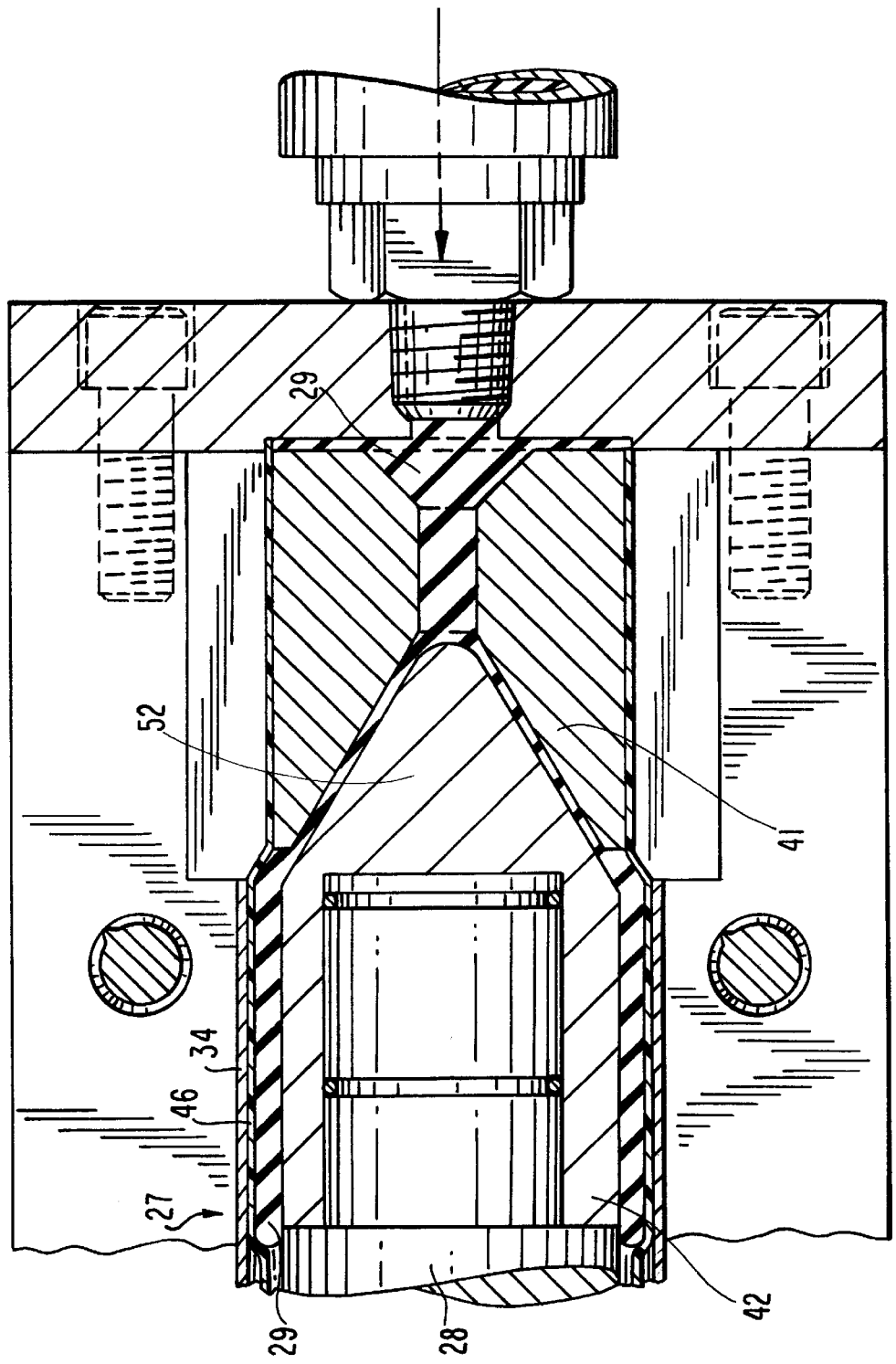

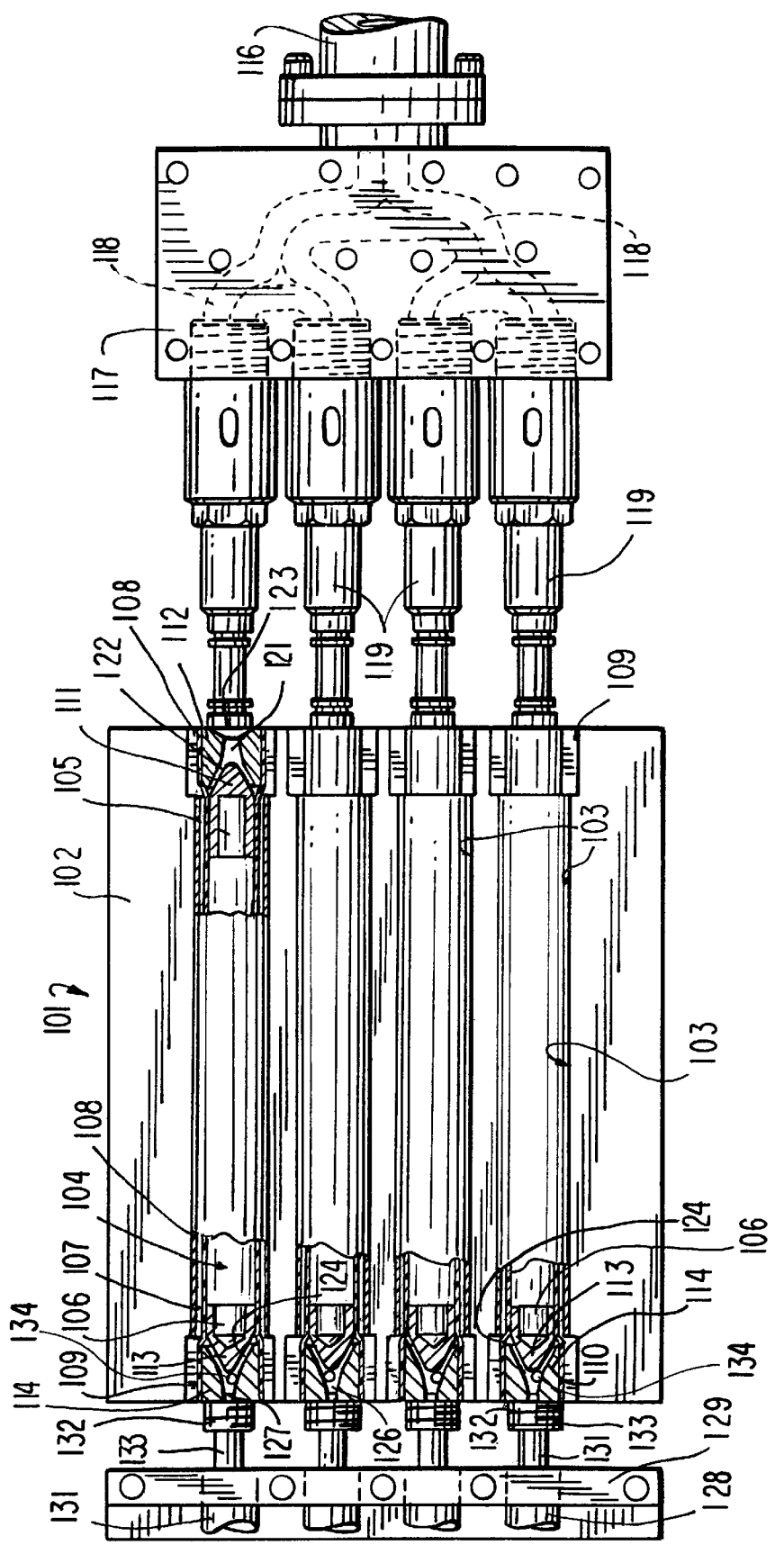

APPARATUS FOR MAKING MULTILAYER ROLLS HAVING A THIN FLUOROPOLYMER TOP COAT

CROSS REFERENCE TO RELATED APPLICATION

This application is a divisional of application Ser. No. 08/959,397, filed Oct. 28, 1997, now U.S. Pat. No. 6,168, 751.

BACKGROUND OF THE INVENTION

This invention relates to a multilayer roll having a thin fluoropolymer top coat on an elastomeric base layer bonded to a rigid insert and methods of preparation of the roll which is particularly well suited for use in xerographic and electro photographic copying machines and printers.

There are a wide variety of rolls used in xerographic copiers and electro graphic printing devices. Typically, these are fabricated with a solid core or insert and have an intermediate elastomeric base layer covered by a smooth top coat, such as a fluoropolymer top coat. The top coat provides an outer surface area of low surface tension. In operations such as fusing, which are generally carried out at elevated temperatures, the low surface tension prevents toner from adhering to the roll surface, or reduced image quality and offset when toner attaches to the roll surface.

Among the various types of rolls utilized in these devices, include fuser, pressure and donor rolls, film forming and drying rolls in wet or liquid toner systems, corona rolls, squeegee rolls, photoconductor rolls, low friction rolls and printing rolls. Thus, there is a large need for rolls where the properties of the top coat can be varied to serve these various end uses. This includes rolls having improved release properties, extended useful life and protect the intermediate elastomeric base layer which is bonded to the roll insert. These needs arise particularly in the case of higher speed applications.

In order to retain the advantages of the elastomeric base coat such as good compliance and efficient heat transfer, it is desirable to provide as thin a fluoropolymer top coat as possible. There are several ways in which a fluoropolymer covered roll with an elastic base layer can be fabricated. Several of these are well known and used for producing rolls used in the electro photographic industry.

The most common way to prepare a roll having a fluoropolymer top coat on an elastomeric base layer is to heat shrink a pre-expanded fluoropolymer tube over a cured elastomer. A more elaborate method uses a "mold in place" technique. Here, an insert is centered in a fluoropolymer tube and elastomeric material is injected between the insert and the outer fluoropolymer tube. In this method, the fluoropolymer tube is generally flexible, yet self-supporting and is typically between about 254 to 635 microns (15 and 25 mils) in thickness. In U.S. Pat. No. 3,613,168 to Rowland and Tabelle a flexible yet self- supporting relatively thick fluoropolymer tube is placed inside a groove in an end piece of a casing which is mounted on a spindle of an extruder to maintain the core and fluoropolymer sleeve concentrically. Silicone rubber is then extruded into the space between the mounted tube and core, which has been mounted on the spindle so that the elastomer material bonds to the core and fluoropolymer sleeve after curing.

Other methods of manufacture include stretching a fluoropolymer sleeve below its yield point and while at this stage, inserting an elastomeric covered roll into the stretched sleeve. Releasing the pressure on the sleeve allows the fluoropolymer sleeve to shrink back and come into complete contact with the roll. In this case, the diameter of the elastomeric roll is larger than the unstretched fluoropolymer sleeve. When a vacuum is used in this process, it provides the added advantage of an air free fluoropolymer/elastomer interface. Alternatively, a fluoropolymer powder or latex can be sprayed or coated onto an elastomeric base layer.

In European Patent Application EP 625 735 to Japan Gore-Tex rolls are provided with a release surface of porous polytetrafluoralethylene top coat in which the pores are impregnated with a cross-linked synthetic rubber over an elastic porous body material of synthetic rubber foam. Here, the thickness of the PTFE release surface can be as low as three microns. The roll is fabricated by applying a non-continuous adhesive layer on the outer surface of the porous silicone rubber base coat and wrapping a porous expanded PTFE film of about 20 microns thick with a pore size of about two microns, one turn about the silicone rubber foam to form a single layer with a slight edge overlap. The entire assembly is then heated to fuse the adhesives and adhere the pores expanded PTFE film to the silicone rubber.

Thin films of porous PTFE impregnated with uncured silicone rubber for forming release top coats having thicknesses as low as three microns are also described in European Patent No. EP 441 114 to Fuji Xerox Co., Ltd. and Japan Gore-Tex, Inc. Here, unbaked polytetrafluoralethylene is expanded forming a fibrillated polytetrafluoralethylene film with voids ranging from 30 to 98 percent and pores from 0.02 microns to 15 microns is soaked with one or more types of silicone rubber to fill the voids. The film is wrapped around the surface of the roll having an elastic body layer and thereafter hardened by heating.

While these rolls and methods of fabrication described in the prior art are generally suitable for producing rolls with PTFE top coats, it remains desirable to provide an improved roll having an expanded PTFE top coat and an improved method of fabricating such rolls.

SUMMARY OF THE INVENTION

Generally speaking, in accordance with the invention, a thin porous fluoropolymer membrane in sheet or sleeve form for forming a roll with a thin fluoropolymer top layer over an elastomeric base layer bonded to a substantially rigid insert is provided. The fluoropolymer member is formed from an extruded film or a sheet which is stretched in both machine and traverse directions, taken to its melting point and at least partially sintered. When the fluoropolymer membrane is in the form of a film, it is wrapped in layers directly over an insert which has been positioned in end spiders with the film wrapped about the insert and extending past the end of the insert to cover the spiders. The top coat and insert assembly is placed into a concentric thin walled molding sleeve which is then placed into the cavity of the book mold. Liquid or flowable solid uncured elastomer material is injected through a spider mounted at the end of the insert into the space between the insert and top coat membrane causing the membrane to expand and fill a tubular mold cavity. Upon application of heat and pressure, the elastomeric material is cured. The wrapped fluoropolymer layers are compressed creating a continuous covering with no evident seam line. Depending on the intended application of the roll, the top fluoropolymer layer can be sintered to a desired degree or remain non-sintered.

In an alternative embodiment, a thin flexible non-self supporting extruded tube of fluoropolymer is utilized in place of the wrapped membrane. Here, the thin non-self supporting tube is fed over the insert and end spiders extending beyond the length of the insert and spiders. The assembled insert and top coat is placed into a tube of a book mold and the uncured elastomeric material is injected between the insert and thin fluoropolymer sleeve expanding and sizing the sleeve to the internal diameter of the tube. The elastomeric material is cured, bonding to the insert and the top coat to the cured elastomer.

The method of fabrication of the roll includes the step of placing the membrane or sleeve over the insert and extending the top coat over the end spiders. This allows injection of resin between the insert and top coat without teasing or wrinkling when injecting the elastomer as the top coat is a non-self supporting sheet or tube. This permits fabrication of rolls having fluoropolymer top coat as thin as three microns.

Accordingly, it is an object of the invention to provide a method of fabricating rolls with a fluoropolymer top layer over an elastomeric base layer bonded to an insert.

Another object of the invention is to provide an improved apparatus for fabricating a roll with a thin fluoropolymer top layer over an elastomeric base layer bonded to an insert.

A further object of the invention is to provide a roll having a thin fluoropolymer top layer from a PTFE expanded sheet or tube having a thickness from about 5 to 50 microns (0.2 to 2.0 mil) on an elastomeric base layer bonded to an insert.

Yet a further object of the invention is to provide an improved method for forming a roll having a thin fluoropolymer top layer over an elastomeric base layer bonded to an insert from an extruded film of the fluoroelastomer.

Yet, another object of the invention is to provide an improved roll with a thin fluoropolymer top layer over an elastomeric base layer bonded to an insert using a thin, non-self supporting extruded sheet or tube of fluoropolymer.

Still other objects and advantages of the invention will in part be obvious and will in part be apparent from the specification.

The invention accordingly comprises the several steps and the relation of one or more of such steps with respect to each of the others, the apparatus embodying features of construction, combination(s) and arrangement of parts which are adapted to effect such steps, and the product which possesses the characteristics, properties, and relation of constituents (components), all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing(s), in which:

FIG. 1 is a perspective view of a mold utilized in the manufacture of the multi-layer roll in accordance with the invention;

FIG. 2 is a partial cut away perspective view of a multi-layer roll fabricated using the book mold of FIG. 1 in accordance with the invention;

FIG. 3 is an exploded view of the book mold of FIG. 1 and roll components and spider assemblies utilized in preparation of the roll of FIG. 2 from an extended sleeve of the fluoroelastomer;

FIG. 4 is a perspective view showing a thin fluoroelastomer film on a storage roll as it is being wrapped around a core and spider assembly in accordance with an embodiment of the invention;

FIG. 6 is a view identical to FIG. 3 showing the portion of the mold after the elastomeric resin has been injected into the spider of FIG. 5;

FIG. 9 is a plan view of a multi-cavity book mold in accordance with another embodiment of the invention with a ball bleed device show prior to injecting resin into the mold in accordance with yet another further embodiment of the invention; and FIG. 10 is a schematic drawing of a sintering device for sintering a roll fabricated in accordance with a further embodiment of the invention.

DESCRIPTION OF THE PREFERRED EMBODIMENTS

Figure 5:
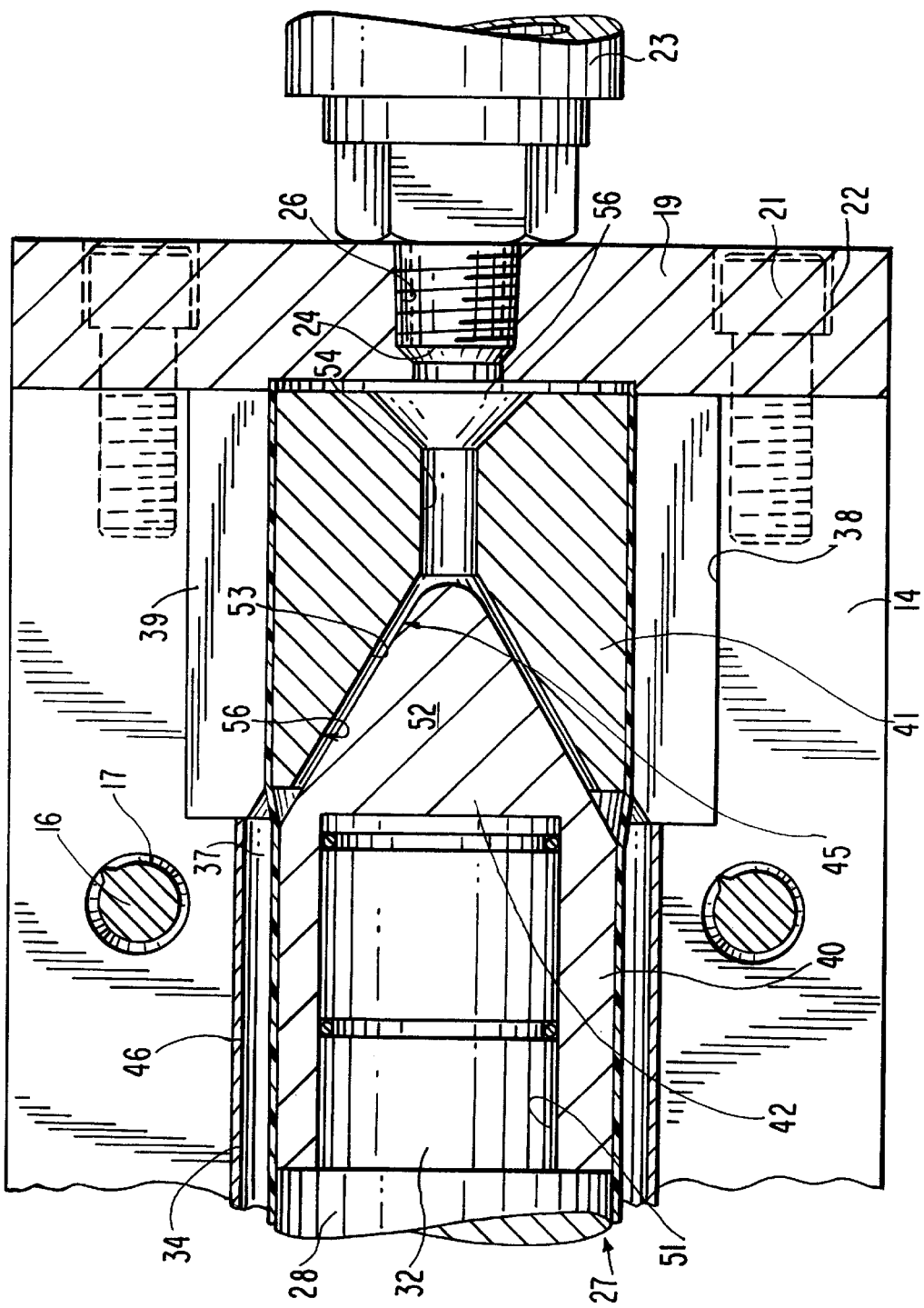
FIG. 5 is a cross-sectional view showing the inlet spider before injecting elastomeric material into the mold taken along line 5—5 of FIG. 1.

FIG. 1 shows an assembled book mold 11 for the in place molding of a multi-layer roll 12 in accordance with the invention shown in a partial cutaway perspective view in FIG. 2. Book mold 11 includes an upper mold section 13 and a mating lower mold section 14 coupled together by a plurality of bolts 16 placed in cooperating holes 17 formed in upper mold section 13 and lower mold section 14. The ends of mold 11 include an inlet face plate 18 and an outlet face plate 19 bolted to the ends of upper and lower mold sections 13 and 14 by a plurality of bolts 21 in cooperating holes 22 in face plates 18 and 19. A hollow spindle 23 having a threaded nipple 24 is coupled to a source of liquid or flowable uncured elastomeric material (not shown). Nipple 24 is threaded into a central opening 26 in inlet face plate 18 for injecting the elastomeric resin into mold 11.

Roll 12 illustrated in FIG. 2 includes a solid core 28 and an elastomeric base layer 29. A thin flexible top coat of fluoropolymer 31 is disposed over and completely encloses elastomeric base layer 29. Core 28 is a solid metal core, but may be hollow depending on the application of the finished roll. Roll 12 as shown includes a solid metal core and is formed with a large journal 32 at the inlet end of core 28 and a small journal 33 at the opposed outlet end of core 28. Journals 32 and 33 may be the same or different sizes depending on the use of the finished rolls. Top coat 31 is applied in the form of a thin flexible sleeve as described in connection with FIG. 3, or a wrapped film as described in connection with FIG. 4.

Referring now to FIG. 3, book mold 11 and roll 12 are shown in an exploded perspective view. This illustrates the individual components of mold 11 and roll 12 assembled during fabrication. Upper mold portion 13 includes an interior cylindrical cavity half 36 and lower mold portion 14 includes a cooperating cylindrical cavity half 37. Mold portions 13 and 14 are assembled to form a hollow cylindrical book mold for receiving a cylindrical sleeve mold 34 with core 28 positioned therein. Each mold portion 13 and 14 is formed with a cooperating end seat 38 for forming a cylindrical opening larger in diameter than sleeve mold 34. A cylindrical spider collar 39 is mounted in each end seat 38 in upper mold portion 13 and lower mold portion 14. Each pair of cylindrical spider collar halves 39 receives a female spider extender 41 with a male spider extender 42 positioned therein for injecting the elastomeric material about core 28.

Positioning female spider extenders 41 and 43 between spider collar halves 39 aids in centering core 28 within the cylindrical cavity in sleeve mold 34. This also retains flexible sleeve 46 of top coat material between the outer cylindrical surface of female spider extenders 41 and 43 and spider collar 39.

Male inlet spider 42 having a cylindrical base 40 and a conical portion 52 is inserted into female spider extender 41 which is positioned on large journal 32. At the opposite outlet end of core 28 outlet female spider extender 43 receives an outlet male spider 44 which is mounted on small journal 33. During preparation of roll 12 for loading into mold 11, male inlet spider 42 is positioned over inlet journal 32, and female inlet spider 41 is placed over male inlet spider 42. Similarly, male outlet spider 44 is placed on outlet journal 33 and placed within female outlet spider 43. Thin flexible top coat sleeve 46 is then placed over core 28 and the assembled spiders mounted on core 28.

Flexible sleeve 46 is formed in a desired thickness and is dimensioned to have a diameter larger than core 28 and a length sufficient to extend over the full length of an assembly 27 of core 28, male spiders 42 and 44 and female spider extenders 41 and 43 and beyond the ends thereof. Sleeve mold 34 is dimensioned to fit into the cylindrical cavity of book mold 11 up against the edge of cylindrical spider collar half 39 and receive core 28 and cylindrical portions 40 of male spiders 42 and 44. When sleeve mold 34 is placed over assembled sleeve 46 and core 28 and positioned in cylindrical groove half 37 in lower mold portion 14, female inlet spider 41 and female outlet spider 43 are resting on spider collars 39 which have been positioned in seats 38 at both ends of lower mold portion 14. This insures that each of the cylindrical elements, including metal core 28, male spiders 42 and 44, flexible sleeve 46 and sleeve mold 47 are all coaxial with the axis of core 28.

Flexible elastomeric sleeve 46 is sufficiently long and extends beyond the ends of the respective spiders at each end of core 28. By doing so, this insures that the uncured elastomeric material which is to be forced into the space between sleeve 46 and the outer surface of core 28 will not wrinkle or tear sleeve 46 when the elastomeric material is injected as will be described in connection with FIGS. 5 and 6.

Turning first to FIG. 4, a supply of an expanded polytetrafluoralethylene membrane 47 wound on a supply roll 48 is shown. PTFE membrane 47 is formed from a PTFE resin which is first mixed with a lubricant then compressed into a pre-form and cold extruded through a sheet die to form a continuous sheet. The continuous sheet is stretched in both the machine and transverse direction and heated to its crystalline melting point. It is then sintered and wound onto supply roll 48. Membrane 47 utilized in accordance with the invention, vary in pore size which can range from 0.05 to over 3.0 microns.

During fabrication of roll 12 in accordance with the invention, PTFE membrane 47 is wrapped in layers directly over assembly 27 of core 28 and sleeve mold 34 with spiders 42 and 44 mounted on journals 32 and 33, respectively is then inserted into mold 11 for fabrication and curing. After membrane 47 has been wound about core and spider assembly 27 the elements are treated in the same fashion as fabrication utilizing sleeve 46. Thus, reference to the following FIGS. 4 and 5 showing injection of elastomeric material is identical regardless of the manner in which the top coat is placed about the assembled core and spider elements. After application of heat and pressure the elastomeric material inside the top coat material is cured. The wrapped layers of PTFE membrane 47 create a continuous covering with no evidence of seam lines. Utilizing membrane 47 allows fabricating a fluorocarbon top layer, such as Teflon, with thicknesses from less than 10 microns (0.2 mils) to over 50 microns (2 mils). The surface porosity of membrane 47 can be further controlled by sintering and pressuring finished roll 12 after it is removed from the sleeve mold.

FIGS. 5 and 6 illustrate in cross-section the large inlet journal end and inlet spider elements of book mold 11. The reference numerals are identical to those utilized in connection with the description of the exploded respective view of FIG. 3. Here, male inlet spider 42 is positioned on large journal 32 at the inlet side of core 28. Female inlet spider 41 is positioned over tapered end 52 of male inlet spider 42 and seated within seat 39 mounted in cylindrical end seat 38 of bottom mold section 14. Flexible sleeve 46 positioned about the assembled spider elements at inlet end of core 28 extends to the inlet side of female inlet spider 41. The inlet end of flexible sleeve 46 is tightly held between the cylindrical outer wall of female inlet spider 41 and seat 39. This insures that flexible sleeve 46 will not be wrinkled when elastic material is injected into the space between sleeve 46 and core 28. Similarly, at the outlet end, the end of flexible sleeve 46 is held between the outer wall of female outlet spider 43 and seat 39'.

Large inlet journal 32 and small outlet journal 33 are constructed essentially the same. Male inlet journal 42 is somewhat longer and includes a longer cylindrical opening 51 for receiving longer inlet journal 32. The inlet end of spider 42 includes a tapered surface for mating with an interior tapered opening 53 in female inlet spider 41. Female spider 41 includes a central bore 54 coupled to a funnel inlet 56 which cooperates with nipple 24 of spindle 23 for injecting elastomer material.

In order to provide a passageway for elastomeric material to flow through female spider 41 to the space between core 28 and sleeve 34, conical end 45 of male spider 42 is formed with a plurality of grooves 57 formed on the outer surface of conical end 52 as shown in FIG. 3. At least three or four grooves should be provided, but as many as six or eight may be provided in order to ensure that elastomeric material flows evenly about the entire surface of core 28 causing topcoat sleeve 34 to expand and engage the interior surface of mold sleeve 46.

After sleeve 34 is placed over spider and core assembly 27 it is inserted into mold sleeve 46 and positioned in bottom mold portion 14, cooperating top mold portion 13 is mounted thereby fully engaging flexible sleeve 46 within seat halves 39. Mold 11 is then secured by bolts 16, end plates 18 and 19 are positioned and secured by bolts 21. At this time, nipple 24 is threaded into opening 26 in inlet plate 19. When the assembled mold sleeve 34 is positioned and mold sections 13 and 14 are secured, elastomeric material is then injected into female inlet spider 41.

Figure 7:
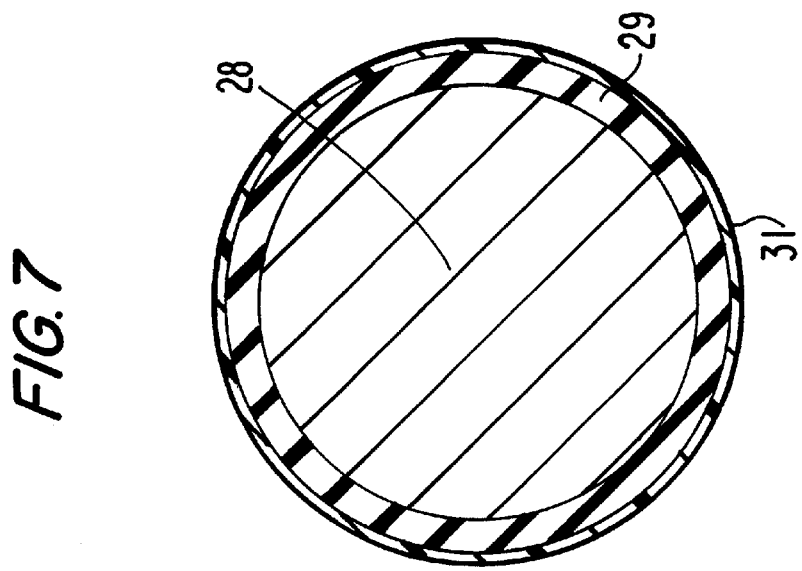
FIG. 7 is a cross-sectional view of the completed roll showing the multi-layer structure.

FIG. 6 shows the identical elements as in FIG. 5; however, elastomeric material 29 can be seen filling the space between flexible sleeve 34 and male inlet spider 42 just as elastomeric material 29 begins to reach the outer surface of core 28. Because the inlet end of sleeve 34 is firmly engaged between the outer surface of female inlet spider 41 and the inner cylindrical surface of inlet spider seat halves 39, sleeve 34 retains its smooth profile without being pulled or wrinkled. Elastomeric material 29 is injected until the entire cavity is filled and material is extruded through female outlet spider 43 in order to produce roll 12 as shown in FIG. 2 and in cross-section in FIG. 7.

Elastomeric material 29 forming the compliant base layer may be a liquid silicone rubber or flowable material in liquid form. The viscosity of these materials can vary from a low of $1.0 \times 10^4$ to as high as $2.5 \times 10^5$ CPS. Elastomeric material 29 is not limited to silicone materials or liquid elastomers. It is possible to utilize mold 11 and prepare multi-layered rolls in accordance with the invention using liquid urethane or other liquid elastomeric materials such as epoxy, polyesters, nitrites and the like.

Once the void about core 28 is filled, closed book mold 11 is heated to cure elastomeric material 29. Cure temperature for a silicone material is typically from about 135° to 204° C. (275° to 400° F.). The actual cycle time is a function of size, material and configuration.

The embodiment of book mold 11 for fabricating roll 12 in accordance with the invention described in connection with FIGS. 1–7 is directed to the use of a single cavity mold. In commercial and higher output applications, a multi-cavity mold 101 as illustrated in FIG. 9 would be used. FIG. 9 illustrates in plan view a lower multi-cavity mold block 102 having four lower cavities 103. A metal core insert 104 with an inlet journal 105 and an outlet journal 106 and a PTFE sleeve 107 thereabout within a mold sleeve 108 is shown seated in each cavity 103 in the same manner as the cavity formed in book mold 11.

Each cavity 103 in lower mold block 102 has an inlet spider mount 108 and an outlet spider mount 109 fixedly mounted at the inlet and outlet to lower mold block 102, respectively for centering all cylindrical elements. An inlet male spider 111 is mounted on inlet journal 105 at the inlet end of insert 104 set within inlet female spider 112 which rests within the recess in spider mount 108. Similarly, an outlet male spider 113 is placed on outlet journal 106 of insert 104 and rests within an outlet female spider 114 which is seated within recess in outlet spider mount 109. When assembled in this manner, PTFE sleeve 107 extends beyond both ends of mold sleeve 108, with the ends retained and held securely by the tight fit between the outer cylindrical surface of female spiders 112 and 114 and spider mounts 109 and 110 in the same manner as the single cavity mold described above. This allows use of an extremely thin and non-self supporting PFTE sleeve which will form outer non-stick top coat 31 of the completed roll 12.

Elastomer for forming the base coat is fed from the extruder (not shown) through a mold inlet 116 to a main feed block 117 which includes a plurality of inlet channels 118 (shown in phantom) leading to the same number of pneumatic actuated cylinder nozzles 121. One nozzle 119 is provided for each cavity 103 at inlet female spider 111 which has an inlet channel 121 and an outlet cavity 122 for receiving male spider 111. Female inlet spider 112 is formed with a spherical opening 123 on the inlet side to act as a bushing for receiving the sprue end of nozzle 119.

The outlet end of mold 101 includes male spider 113 mounted on an outlet journal 106 of insert 104 and is disposed within a cavity 124 of female spider 114 which is positioned in spider mount 109. Each outlet female spider 114 includes a bleed cavity 126 with a bleed opening 127 which is engaged by a bleed hydraulic cylinder 128. Cylinders 128 are mounted on a cylinder block 129 and include a cylinder rod 131 with a bleed cylinder rod end 132 with bleed slots 133 which engage bleed outlet 127 of female spider 114. Each cylinder rod end 132 includes a bleed slot 133 permitting escape of air therethrough. Each bleed cavity 126 in female spider 114 has a ball bleed element 134 seated therein. Element 134 is displaceable within cavity 126 and acts as a seal when the cavity fills with elastomer by closing bleed outlet 127. For example, when bleed outlet 127 is 0.476 cm (³⁄₁₆ inch) in diameter, ball bleed element 134 is 635 cm (0.25 inch) in diameter. Thus, when positioned of bleed outlet 127, ball element 134 will close the particular cavity.

During operation, as elastomer is fed into mold 101 from the extruder, air present in cavities 103 is expelled through bleed slots 133 in cylinder rod ends 132. As elastomer progresses along the outside surface of one insert 104, air continues to be expelled through bleed slots 133 and elastomer reaches bleed ball 134 in female spider 114. At this time, bleed ball element 134 is forced to the outlet side of cavity 126. This effective closes outlet 127 of female spider 114 and prevents additional elastomer from entering a particular cavity. This insures that elastomer is evenly distributed into each cavity about the surface of insert 104 and stretches PTFE sleeves 106 thereabout and causes each remaining cavity 103 to fill and be sealed in the same manner. The same type of bleed element to close single cavity mold of the type illustrated FIGS. 1–7 can also be used.

Mold block 102 is mounted on a heated platen (not shown) so that mold sleeves 108 can be heated and cured. Elastomer 116 cures within about 2 to 10 minutes and mold 101 is then released from nozzles 121 and opened to retrieve the completed rolls.

Once elastomer 116 cures, the mold sleeve part assemblies with insert and siders are cooled, for example, by quenching in cold water, and opened to remove the rolls with sleeves 108. The multi-layer inserts 104 are removed, excess topcoat and elastomer are trimmed from the ends about journals 105 and 106 to provide a completed multi-layer molded roll as roll 12 in FIG. 2. When a PFA sleeve is used, the manufacturing process is completed. If a fibrillated Teflon membrane has been wound about insert 104, the molded roll is generally sintered to complete preparation. Alternatively, sintering can be accomplished prior to trimming the excess coatings about journals 105 and 106. The sintering steps are described in the examples in more detail below.

The following examples describe preparation of a multi-layer rolls having a fluoroelastomer top coat over a silicone base coat on a metal insert. These examples are presented for purposes of illustration only, and is not intended to be construed in a limiting sense.

EXAMPLES 1–4

Using the method just outlined, the following rolls using the materials identified were prepared. When preparing each roll using a PTFE film, approximately seven wraps of the PTFE membrane are placed about a metal insert and spider assembly to provide a final top coat of about 12.5 microns (one-half mil) in thickness. The membrane is wrapped about the core and spider assembles prior to being placed into the sleeve mold. Elastomeric rubber is then inserted at a pressure of about 63,279 kg/m² (90 psi), but this could be increased several fold to 703,100 kg/m² (1000 psi). Cure time is approximately 10 to 15 minutes. The thickness of the base elastomeric coat can vary from 250 microns (10 mil) to 1.25 cm (½ inch). The final thickness will depend on the desired end use which is easily obtained by varying the relative dimension of the outer portion of the metal insert and the interior of the cavity of the sleeve mold.

(1) A fuser and pressure roll of a Tetratec porous membrane and DC590 (silicone) as the elastic material.

(2) A film forming-drying roll was formed of a Tetratec porous membrane as the topcoat and a liquid urethane as the elastomeric base coat.

(3) A highly conformable roll using a Tetratec porous membrane as the top coat and a foam silicone DC3-6548 as the elastomeric base material.

(4) A fusing role was formed of a Tetratec porous-membrane as the top coat and DC 730 as the elastomeric base material. This roll was then vacuum soaked in a silicone solution allowed to cure at room temperature for 48 hours. The roll was then sanded smooth with the excess silicone removed exposing a Tetratec-silicone surface providing oleophillic surface properties. This surface is easily wetted by silicone oil for providing uniform coverage while maintaining good release, mechanical and comformability, desirable combined characteristic for a fuser roll.

EXAMPLE 5

As noted above, polytetrafluoralethylene membrane 47 may be sintered or maintained non-sintered. The degree of sintering can range from no additional sintering which provides a porous surface to a fully sintered film wherein 99 to 100 percent of the porosity has been eliminated by the process. The sintering process entails a combination of subjecting the molded roll to varying degrees of pressure and temperature for a selected period of time.

The following are varying sintering condition for the membrane described in connection with a fibrillated PTFE membrane as shown in FIG. 4.

| Example of Partially Sintered Roller: | |
| --- | --- |
| Rubber: | Silicone 50 Shore A |
| Toplayer: | 25 micron fibrillated PTFE |
| Load on roll: | 0.18 kg per linear cm (15 lbs per linear inch) |
| Temperature-preheat ° C. (° F.) | 218–232 (425–450) |
| Sintering temperature: ° C. (° F.) | 330–343 (625–650) |
| Time: | 120–240 secs. |
| Example of Fully Sintered Roller: | |
| Rubber: | Silicone 50 Shore A |
| Toplayer: | 25 micron fibrillated PTFE |
| Load on roll: | 0.18 kg per linear cm (15 lbs per linear inch) |
| Temperature-preheat ° C. (° F.) | 218–232 (425–450) |
| Sintering temperature: ° C. (° F.) | 343–413 (650–775) |
| Time: | 240–360 secs. |

In accordance with this aspect of the invention, a schematic of a sintering device 151 is illustrated in FIG. 10. Here, a roll 152 having an outer surface of a membrane 153 which has been formed by injecting elastomeric material and curing is placed into sintering device 151.

Sintering device 151 includes a series of infrared lamps 154 disposed about the outer surface of roll 152 and includes a pressure roller 156 for applying the desired pressure. During the sintering process, roll 152 is rotated thereby providing pressure evenly about the outer surface of roll 152 as it is rotated to insure uniform heating and sintering of the outer surface 153.

Alternatively, sintering may utilize a heated drum or roll, rather than sintering lamps. In this case, infrared lamps 154 are not utilized and drum 156 is a heated drum, generally heated to temperatures of about 475 to 500° C. (842 to 932° F.). This will provide sufficient heat to sinter the top coat and adjust porosity as desired.

When forming multi-layer rolls in accordance with the invention using thin flexible sleeves, extruded perfluoroalkxy resin sleeves are used. These PFA sleeves are available in thicknesses raging from 50 to 250 microns (2 to 10 mils).

Figure 8:
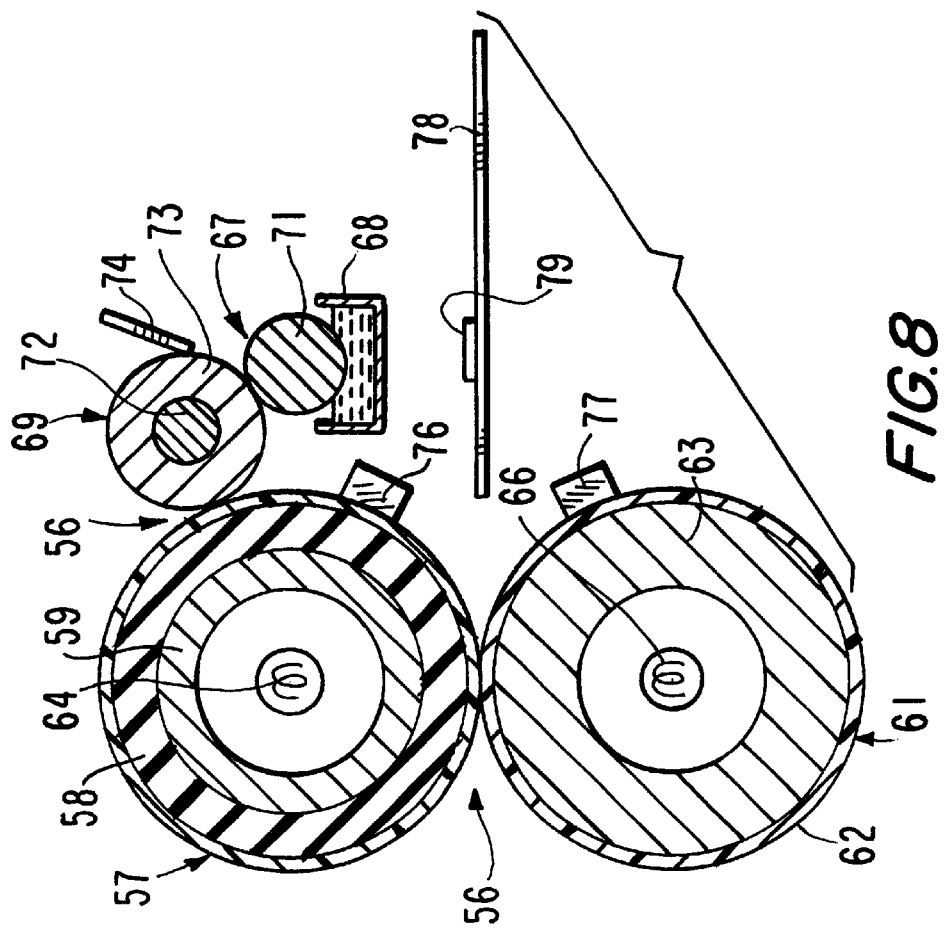
FIG. 8 is a schematic-sectional view of a fixing unit of a repographic machine equipped with an elastic fixing roll constructed and arranged in accordance with the invention.

FIG. 8 is a schematic view illustrating use of a fixing unit 56 prepared in accordance with the invention in a reprographic machine including a hollow fixing roll 57 having an elastomeric base coat 58 on a hollow insert. A pressure roll 61 which rotates in contact with fixing roll 57 was prepared by coating a PTFE film 62 on the surface of a metal core 63. Both rolls 57 and 61 are hollow and provided with heat sources such as infrared lamps 64 and 66, respectively, on the inside thereof. An oil feeding unit 67 is utilized to prevent toner offset by providing oil from an oil pan 68 to an oil coating roll 69 via an oil pick up roll 71. Oil coating roll 69 has a metal core 72 coated with a silicone rubber coating 73 on the outside thereof. Oil coating roll 69 provides a constant amount of oil to fixing roll 57. Oil feeding unit 67 includes a blade member 74. Fixing unit 56 includes whipping devices 76 and 77 which clean rolls 57 and 61 at a copy medium 78 having an image 79 thereon is fed between fixing roll 57 and pressure roll 61.

Book mold 11 in FIG. 1 includes a single mold sleeve 46. This has been set forth for purposes of illustration only and not by way of limitation. During commercial production of rolls 12 book molds including a plurality of molding cavities 103 as shown in FIG. 9 for receiving a plurality of molding sleeves and corresponding seats are used. This will permit formation of several rolls from a single injection of elastomeric material and a single cure cycle of a book mold having multiple cavities for receiving a plurality of sleeve molds.

Accordingly, fabricating a multi-layer roll having a thin non-stick top coat on an elastomeric baselayer in accordance with the invention is a one step process. The multi-layer roll construction uses a fluoropolymer film in sheet form or sleeve form. This allows molding in place with an elastomeric material injected between the outer coat and a metal insert. By utilizing a concentric tube as the mold allows accurate positioning of the core and elastomeric and top coat layers as they are retained in the molding sleeve within a book mold enclosure. The method in accordance with the invention provides a one step process for molding in place. Because the thin top coat sleeve or membrane is held by a spider upstream of the point of elastomer injection, tearing or wrinkling of the thin top coat film is avoided. A wide variety of sizes, thickness of base coat and top coat are also obtainable. There is a wide range of flexibility in controlling the film thickness as well as providing a low cost fabrication technique.

It will thus be seen that the objects set forth above, among those made apparent from the preceding description, are efficiently attained and, since certain changes may be made in carrying out the above method, and in the article set forth without departing from the spirit and scope of the invention, it is intended that all mater contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An apparatus for fabricating a multi-layer roll with a fluoropolymer top coat formed from a fluoropolymer membrane on an elastomeric base layer bonded to a substantially rigid cylindrical core, comprising:

a mold having a cylindrical mold cavity having an inlet and an outlet for receiving a cylindrical mold sleeve;

a cylindrical mold sleeve and spider elements for mounting on the ends of the core and extending beyond the ends of the mold sleeve to form a roll assembly and when inserted into the mold sleeve adapted to seat within the cylindrical cavity of the mold;

the spider elements mounted on at least one end of the core for directing injected flowable elastomer material into the roll assembly between the core and top coat membrane positioned in the mold sleeve;

the cylindrical mold cavity including a region for engaging the top coat membrane between the spider elements and the mold when the mold sleeve is placed in the mold;

a source of elastomeric material for injection into the roll assembly; and means for heating the mold to cure the elastomeric material.

2. The apparatus for fabricating a multi-layer roll of claim 1, wherein means for directing elastomeric material between the core and top coat membrane comprise a substantially cylindrical spider element having channels for distributing the elastomeric material about the core.

3. The apparatus for fabricating a multi-layer roll of claim 2, wherein the spider element includes a male section adapted to be mounted on the end of the core having a cylindrical portion and a tapered conical portion, the tapered conical portion including channels extending from the end of the tapered conical portion to the cylindrical portion, and a female section including a central opening for feeding elastomeric material to the tapered conical portion of the male section and a tapered opening for receiving the tapered conical portion of the male section and having an outer cylindrical wall for engaging the top coat membrane with the mold cavity when the mold is closed.

4. The apparatus for fabricating a multi-layer roll of claim 1, further including means for bleeding excess elastomeric material at the mold outlet.

5. The apparatus for fabricating a multi-layer roll of claim 4, wherein the means for bleeding includes a bleed element having a dimension greater than a channel adapted to be displaced in the channel when the mold is full to prevent addition or bleeding of further elastomeric material to the mold cavity.

6. An apparatus for fabricating a plurality of multi-layer rolls with a fluoropolymer top coat on an elastomeric base layer bonded to a substantially rigid cylindrical core, comprising:

a plurality of cylindrical mold sleeves;

a book mold having a bottom section and cooperating upper section for forming a plurality of cylindrical mold cavities for receiving the mold sleeves when the mold is closed, each mold cavity adapted to receive and center a roll insert disposed within the mold sleeves and securely engage a flexible fluoropolymer top coat membrane about the roll insert and extending beyond the ends of the mold sleeves;

the mold formed with an inlet for injecting elastomeric material into roll assemblies; and means mounted on one end of the mold for directing injected flowable elastomeric material between the core and top coat membrane in a cylindrical mold sleeve positioned in the mold cavity;

means for heating the mold to cure the elastomeric material.

7. The apparatus for fabricating a multi-layer roll of claim 6, wherein the means for directing elastomeric material between the core and top coat membrane is a substantially cylindrical spider element having channels for distributing the elastomeric material about the core.

8. The apparatus for fabricating a multi-layer roll of claim 7, wherein the spider element includes a male section adapted to be mounted on the end of the core having a cylindrical portion and a tapered conical portion, the tapered conical portion including channels extending from the end of the tapered conical portion to the cylindrical portion, and a female section including a central opening for feeding elastomeric material to the tapered conical portion of the male section and a tapered opening for receiving the tapered conical portion of the male section and having an outer cylindrical wall for engaging the top coat membrane with the mold cavity when the mold is closed.

9. The apparatus for fabricating a multi-layer roll of claim 8, further including means for bleeding excess elastomeric material at the mold outlet.

10. The apparatus for fabricating a multi-layer roll of claim 9, wherein the means for bleeding includes a bleed element having a dimension greater than a channel adapted to be displaced in the channel when the mold is full to prevent addition or bleeding of further elastomeric material to the mold cavity.

* * * * *